(12) United States Patent
Ohshima et al.

(10) Patent No.: US 11,766,936 B2
(45) Date of Patent: Sep. 26, 2023

(54) CONTROL DEVICE, MOVING BODY AND COMPUTER-READABLE STORAGE MEDIUM

(71) Applicant: HONDA MOTOR CO., LTD., Tokyo (JP)

(72) Inventors: Satoshi Ohshima, Saitama (JP); Naoki Yui, Saitama (JP); Kazuhiro Saito, Saitama (JP); Yoshiharu Saito, Saitama (JP); Takuya Iwata, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 280 days.

(21) Appl. No.: 17/213,231

(22) Filed: Mar. 26, 2021

(65) Prior Publication Data

US 2021/0300182 A1 Sep. 30, 2021

(30) Foreign Application Priority Data

Mar. 30, 2020 (JP) ................. 2020-061565

(51) Int. Cl.
*B60K 35/00* (2006.01)
*B60L 15/20* (2006.01)

(52) U.S. Cl.
CPC .............. *B60K 35/00* (2013.01); *B60L 15/20* (2013.01); *B60K 2370/167* (2019.05);
(Continued)

(58) Field of Classification Search
CPC .............. B60K 35/00; B60K 2370/167; B60K 2370/169; B60L 15/20; B60L 2240/423; B60L 2240/54
See application file for complete search history.

(56) References Cited

U.S. PATENT DOCUMENTS

2010/0030413 A1 2/2010 Jinno
2013/0038439 A1* 2/2013 Saito ...................... B60K 35/00
340/439

(Continued)

FOREIGN PATENT DOCUMENTS

CN 107379968 A 11/2017
CN 107399328 A 11/2017
(Continued)

OTHER PUBLICATIONS

Office Action issued for counterpart Japanese Application No. 2020-061565, issued by the Japanese Patent Office dated Nov. 9, 2021 (dated Nov. 4, 2021).

(Continued)

*Primary Examiner* — Tyler J Lee
*Assistant Examiner* — Yufeng Zhang

(57) ABSTRACT

Provided is a control device comprising: a motor output decision unit configured to decide a magnitude of an output of the motor, based on a magnitude of a requested output that is an output requested to be supplied to drive wheels; a first rotation number decision unit configured to decide a first target value of a rotation number of the motor, based on the magnitude of the output of the motor decided by the motor output decision unit; and a display control unit configured to change a display method of the power indicator in a case where the motor supplies power to the drive wheels in a first mode and in a case where the motor supplies power to the drive wheels in a second mode different from the first mode.

13 Claims, 10 Drawing Sheets

(52) U.S. Cl.
 CPC ... *B60K 2370/169* (2019.05); *B60L 2240/423* (2013.01); *B60L 2240/54* (2013.01)

(56) References Cited

U.S. PATENT DOCUMENTS

| | | |
|---|---|---|
| 2014/0032029 A1 | 1/2014 | Hirasawa |
| 2016/0240165 A1* | 8/2016 | Suzuki ................ G09G 5/14 |
| 2017/0274793 A1 | 9/2017 | Ishibashi |
| 2017/0274910 A1 | 9/2017 | Ishibashi |
| 2018/0170166 A1 | 6/2018 | Sugiyama |
| 2018/0297465 A1 | 10/2018 | Miyaishi |
| 2020/0398666 A1* | 12/2020 | Higuchi ............ B60W 20/10 |
| 2022/0153136 A1* | 5/2022 | Kamei ................ B60K 35/00 |

FOREIGN PATENT DOCUMENTS

| | | |
|---|---|---|
| CN | 108216189 A | 6/2018 |
| JP | 2008114791 A | 5/2008 |
| JP | 2013154716 A | 8/2013 |
| JP | 2013154717 A | 8/2013 |
| JP | 2016084915 A | 5/2016 |
| WO | 2012143989 A1 | 10/2012 |
| WO | 2016174920 A1 | 11/2016 |

OTHER PUBLICATIONS

Office Action issued for counterpart Chinese Application 202110294893.5, issued by The State Intellectual Property Office of People's Republic of China dated Jul. 1, 2023.

\* cited by examiner

CONTROL DEVICE, MOVING BODY AND COMPUTER-READABLE STORAGE MEDIUM

BACKGROUND

1. Technical Field

The contents of the following Japanese patent application are incorporated herein by reference:

NO. 2020-061565 filed in JP on Mar. 30, 2020.

The present invention relates to a control device, a moving body, and a computer-readable storage medium.

2. Related Art

Patent Document 1 discloses adjusting an engine rotation number that is displayed on a tachometer in a hybrid vehicle having a pseudo stepped shifting mode. Patent Document 2 relates to a hybrid vehicle and discloses an instrument configured to notify an operating state, a regeneration state and the like of a power source to a driver.

CITATION LIST

Patent Document

Patent Document 1: Japanese Patent Application Publication No. 2016-84915
Patent Document 2: Japanese Patent Application Publication No. 2008-114791

DESCRIPTION OF EXEMPLARY EMBODIMENTS

Figure 1:
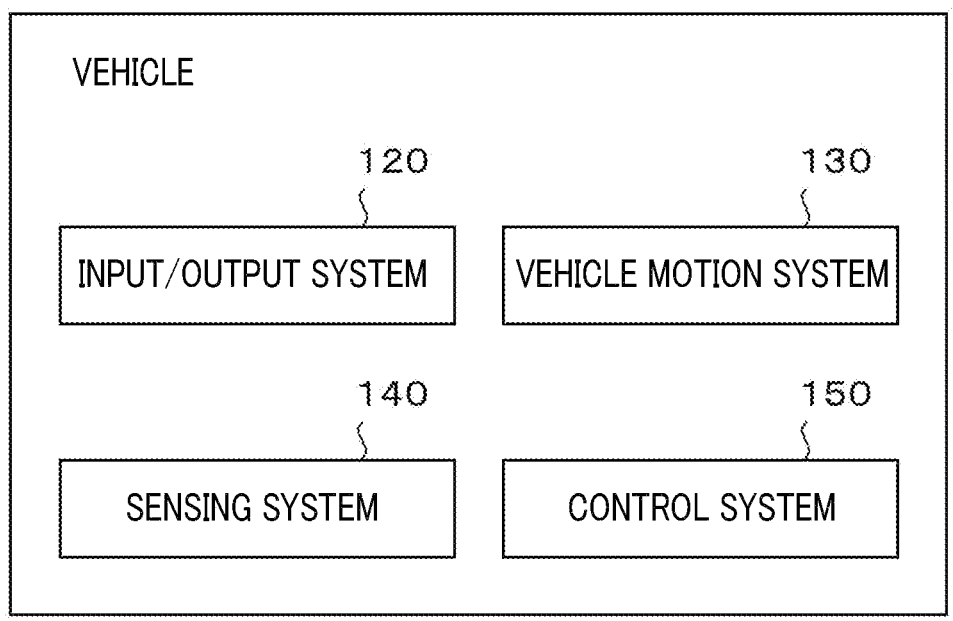
FIG. 1 schematically shows an example of a system configuration of a vehicle 100.

Hereinafter, the present invention will be described through embodiments of the invention. However, the following embodiments do not limit the invention defined in the claims. Also, all combinations of features described in the embodiments are not necessarily essential to solutions of the invention. Note that, in the drawings, the same or similar parts are denoted with the same reference signs, and the overlapping descriptions may be omitted.

[Outline of Vehicle 100]

FIG. 1 schematically shows an example of a system configuration of a vehicle 100. In the present embodiment, the vehicle 100 comprises an input/output system 120, a vehicle motion system 130, a sensing system 140, and a control system 150.

Examples of the vehicle 100 include a bicycle, an automobile, an automatic two-wheeled vehicle, an electric train and the like. Examples of the automatic two-wheeled vehicle include (i) a motorcycle, (ii) a three-wheeled motorcycle, and (iii) a standing two-wheeled vehicle or three-wheeled vehicle with a power unit such as Segway (registered trademark), a kickboard (registered trademark) with a power unit, a skateboard with a power unit and the like. The vehicle 100 preferably comprises an electricity storage device and an electric motor.

In the present embodiment, the input/output system 120 is configured to function as a user interface with a user of the vehicle 100. The user may be an occupant in the vehicle 100. The occupant may be a driver of the vehicle 100.

For example, the input/output system 120 is configured to receive a user's instruction or operation of the vehicle 100. The input/output system 120 may be configured to output information indicative of a content of the instruction or operation to the control system 150. The input/output system 120 is also configured to present the user with information indicative of a state of the vehicle 100. The input/output system 120 may also be configured to present the user with the information indicative of the state of the vehicle 100 by controlling an instrument configured to indicate the state of the vehicle 100. The input/output system 120 will be described in detail later.

In the present embodiment, the vehicle motion system 130 is configured to drive the vehicle 100, to brake the vehicle 100, and to change a traveling direction of the vehicle 100. The vehicle motion system 130 may also be configured to drive the vehicle 100 by using at least electric energy. The vehicle motion system 130 may also be configured to brake the vehicle 100 by converting at least a part of the kinetic energy of the vehicle 100 into the electric energy. The vehicle motion system 130 will be described in detail later.

In the present embodiment, the sensing system 140 is configured to measure a variety of physical quantities relating to the vehicle 100. The sensing system 140 may be configured to output information indicative of a measurement result to the control system 150. The sensing system 140 will be described in detail later.

In the present embodiment, the control system 150 is configured to control each unit of the vehicle 100. For example, the control system 150 is configured to acquire information indicative of the user's instruction or operation on the vehicle 100 from the input/output system 120. The control system 150 is configured to control the vehicle motion system 130 so that the vehicle 100 moves according to the user's instruction or operation.

The control system 150 may also be configured to manage the state of the vehicle 100. For example, the control system 150 is configured to acquire information indicative of states of each unit of the vehicle 100 from the sensing system 140. The control system 150 is configured to control the input/output system 120 to present the user with the information indicative of the state of the vehicle 100. Examples of the state of the vehicle 100 include a state of power that is output by the vehicle motion system 130, a state of regenerative electric power of the vehicle motion system 130, a state of a drive force for the vehicle 100, a state of a braking force of the vehicle motion system 130, and the like.

The control system 150 may also be configured to manage an operation mode of the vehicle 100. In the present embodiment, the control system 150 is configured to adjust a value (which may also be referred to as an output display value) indicative of a magnitude of power that is output by the vehicle motion system 130, according to the operation mode of the vehicle 100. The output display value is presented to the user via the input/output system 120, for example.

For example, the control system 150 is configured to adjust the output display value so that a variation pattern of the state of the vehicle 100 that is perceived by the five senses of the user substantially matches a variation pattern of the output display value that is presented to the user. Thereby, for example, a variation of the magnitude of power that is output by the vehicle motion system 130 and is displayed on the instrument and an engine sound that is perceived by the user are substantially matched. For this reason, the discomfort that the user feels while driving the vehicle 100 is greatly suppressed. As a result, the user can drive the vehicle 100 more safely. The control system 150 will be described in detail.

[Specific Configurations of Each Unit of Vehicle 100]

Each unit of the vehicle 100 may be implemented by hardware, software or hardware and software. At least a part of each unit of the vehicle 100 may be implemented by a control unit such as an ECU (Electronic Control Unit). At least a part of each unit of the vehicle 100 may also be implemented by a personal computer or a portable terminal. For example, the personal computer or the portable terminal may be used as the user interface of the input/output system 120. Examples of the portable terminal include a mobile phone, a smartphone, a PDA, a tablet, a notebook computer or laptop computer, a wearable computer and the like.

In a case where at least some of the constitutional elements constituting the vehicle 100 is implemented by software, the constitutional elements implemented by the software may be realized as programs prescribing operations of the constitutional elements are activated in an information processing device having a general configuration. The information processing device includes, for example, (i) a data processing device having a variety of processors (for example, a CPU, a GPU and the like), a ROM, a RAM, a communication interface and the like, and (ii) a storage device (including an external storage device) such as a memory, an HDD and the like. The information processing device may also include (iii) an input device such as a keyboard, a touch panel, a camera, a microphone, diverse sensors, a GPS receiver and the like, and (iv) an output device such as a display device, a speaker, a vibration device and the like.

In the information processing device, the data processing device or the storage device may be configured to store a program. The information processing described in the program functions as a specific means where software relating to the program and a variety of hardware resources of the vehicle 100 cooperate with each other, as the program is read into the computer, for example. The specific means implements calculation or processing of information corresponding to a using purpose of the computer of the present embodiment, so that the vehicle 100 corresponding to the using purpose is established.

The program may also be stored in a computer-readable medium. The program may also be stored in a non-transitory computer-readable recording medium. The program may also be stored in a computer-readable medium such as a CD-ROM, a DVD-ROM, a memory and a hard disk, or may also be stored in a storage device connected to a network. The program may be installed into a computer, which constitutes at least a part of the vehicle 100, from the computer-readable medium or the storage device connected to the network.

By the program being executed, a computer mounted on the vehicle 100 may function as at least a part of each unit of the vehicle 100. By the program being executed, the computer mounted on the vehicle 100 may execute an information processing method in at least a part of each unit of the vehicle 100.

A program for causing a computer mounted on the vehicle 100 to function as at least a part of each unit of the vehicle 100 includes, for example, a module in which operations of at least a part of each unit of the vehicle 100 are prescribed. When the program or the module is executed, the program or the module acts on the data processing device, the input device, the output device, the storage device and the like to cause the computer to function as each unit of the vehicle 100 or to cause the computer to execute the information processing method in each unit of the vehicle 100.

The information processing method may be a control method of the vehicle 100. The control method of the vehicle 100 may be a control method for controlling the input/output system 120 to present a magnitude of power that is output by the vehicle motion system 130 to the user of the vehicle 100.

The control method includes a motor output decision step of deciding a magnitude of an output of the motor, based on a magnitude of a requested output that is an output requested to be supplied to drive wheels and a magnitude of electric power that is requested from an auxiliary device of the vehicle and an on-board battery, for example. The control method includes a first rotation number decision step of deciding a first target value of the rotation number of the motor, based on the magnitude of the output of the motor decided in the motor output decision step, for example. The control method includes a display control step of changing a display method of a power indicator in a case where the motor supplies power to the drive wheels in a first mode and in a case where the motor supplies power to the drive wheels in a second mode different from the first mode, for example. In the control method, the motor supplies power to the drive wheels in the second mode when the output of the motor decided in the motor output decision step is equal to or larger than a predetermined first threshold value and the first target value of the rotation number decided in the first rotation number decision step is equal to or larger than a predetermined second threshold value, for example.

The vehicle 100 may be an example of the moving body. The control system 150 may be an example of the control device.

In the present embodiment, the control system 150 has been described in detail with reference to the example where the control system 150 controls the instrument configured to indicate the state of the vehicle 100. However, the control system 150 is not limited to the present embodiment. The control system 150 may also be configured to control an instrument configured to indicate a state of any type of the moving body.

Examples of the moving body include a ship, a flying object and the like, in addition to the vehicle. Examples of the ship include a boat, a hovercraft, a personal watercraft, a submarine, a submersible, an underwater scooter, and the like. Examples of the flying object include an airplane, an airship or a flying balloon, a balloon, a helicopter, a drone, and the like.

Figure 2:
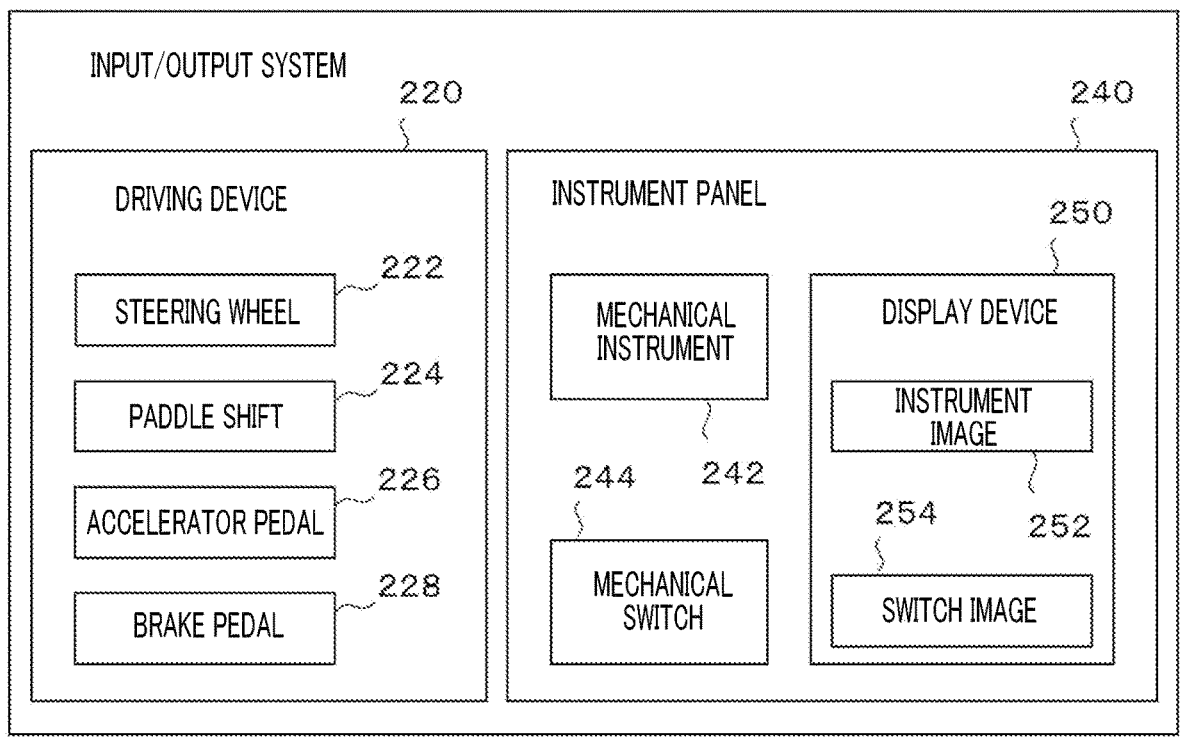
FIG. 2 schematically shows an example of an internal configuration of an input/output system 120.

FIG. 2 schematically shows an example of an internal configuration of the input/output system 120. In the present embodiment, the input/output system 120 includes a driving device 220, and an instrument panel 240. In the present embodiment, the driving device 220 includes a steering wheel 222, a paddle shift 224, an accelerator pedal 226, and a brake pedal 228. In the present embodiment, the instrument panel 240 includes a mechanical instrument 242, a mechanical switch 244, and a display device 250. In the present embodiment, for example, an instrument image 252 and a switch image 254 are displayed on the display device 250.

In the present embodiment, the driving device 220 is configured to receive a user's operation on the vehicle 100. The user operates the steering wheel 222, so that a steering amount of the vehicle 100 is input. The user operates the paddle shift 224, so that a setting relating to a magnitude of the braking force by regeneration of the vehicle 100 is changed. The user operates the accelerator pedal 226, so that an acceleration operation amount of the vehicle 100 is input. The user operates the brake pedal 228, so that a braking operation amount of the vehicle 100 is input.

In the present embodiment, diverse switches for receiving the user's instruction or operation are arranged on the instrument panel 240. A variety of instruments for presenting the user with the state of the vehicle 100 are also arranged on the instrument panel 240.

The mechanical instrument 242 is configured to indicate the state of the vehicle 100 by a mechanical mechanism. The mechanical switch 244 is configured to receive the user's instruction or operation by a mechanical mechanism. The instrument image 252 may be a digital image functioning as any type of an instrument configured to indicate the state of the vehicle 100. The switch image 254 may be a digital image functioning as a switch for receiving the user's instruction or operation.

Note that, (i) each of the mechanical instrument 242 and the instrument image 252 may individually present the user with the information indicative of the state of the vehicle 100, or (ii) a combination of the mechanical instrument 242 and the instrument image 252 may present the user with the information indicative of the state of the vehicle 100. In addition, (i) each of the mechanical switch 244 and the switch image 254 may individually receive the user's instruction or operation or (ii) a combination of the mechanical switch 244 and the switch image 254 may receive the user's instruction or operation.

As the display device 250, any display device such as a liquid crystal display, an organic EL display and a projector can be used. The display device 250 may have a transmission type display or a non-transmission type display. The display device 250 may also be a head up display configured to display an image on a transmission type screen.

The instrument panel 240 may be an example of the power indicator. The mechanical instrument 242 may be an example of the power indicator. The display device 250 may be an example of the power indicator. The instrument image 252 may be an example of the power indicator.

In the present embodiment, the input/output system 120 has been described in detail with reference to the example where the driving device 220 and the instrument panel 240 receive the user's instruction or operation. However, the input/output system 120 is not limited to the present embodiment. In another embodiment, a voice input device, a gesture input device, a visual line input device and the like can be used as the input/output system 120.

Figure 3:
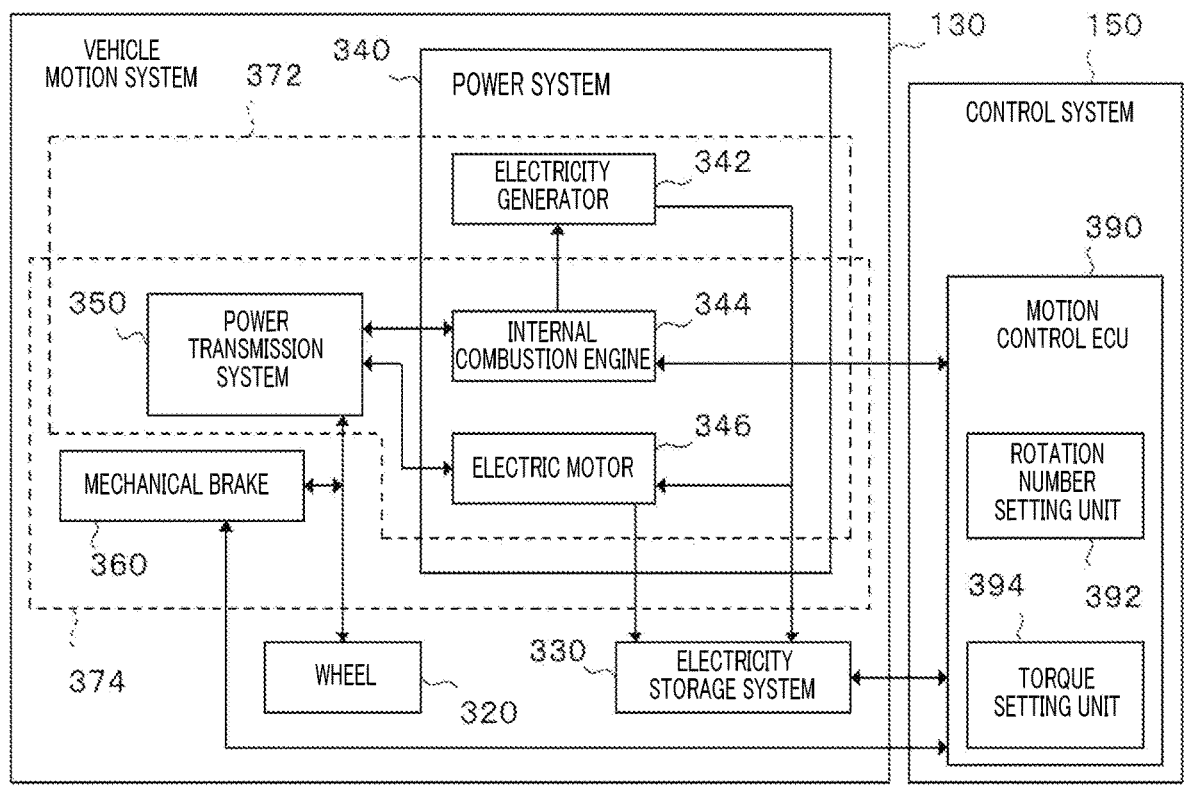
FIG. 3 schematically shows an example of an internal configuration of a vehicle motion system 130.

FIG. 3 schematically shows an example of an internal configuration of the vehicle motion system 130. FIG. 3 also schematically shows an example of control of the vehicle motion system 130 by the control system 150.

In the present embodiment, the vehicle motion system 130 includes wheels 320, an electricity storage system 330, a power system 340, a power transmission system 350, and a mechanical brake 360. In the present embodiment, the power system 340 includes an electricity generator 342, an internal combustion engine 344, and an electric motor 346. In the present embodiment, the control system 150 includes a motion control ECU 390. In the present embodiment, the motion control ECU 390 includes a rotation number setting unit 392 and a torque setting unit 394.

In the present embodiment, the electricity generator 342, the internal combustion engine 344, the electric motor 346 and the power transmission system 350 may constitute a part of a drive system 372 configured to drive the vehicle 100. In the present embodiment, the internal combustion engine 344, the electric motor 346, the power transmission system 350 and the mechanical brake 360 may also constitute a part of a braking system 374 configured to brake the vehicle 100. As shown in FIG. 3, in the present embodiment, at least a part of the drive system 372 functions as the braking system 374.

In the present embodiment, the wheels 320 are configured to rotate by a drive force transmitted from the power transmission system 350. The rotating speed of the wheels 320 is lowered by a braking force transmitted from the power transmission system 350.

In the present embodiment, the electricity storage system 330 is configured to supply energy to the wheels 320. The electricity storage system 330 is configured to store the electric energy. The electricity storage system 330 may also be configured to receive electric power that is supplied from an external charging facility and to store the electric energy. The electricity storage system 330 may also be configured to receive regenerative electric power that is supplied from the electric motor 346 and to store the electric energy. The electricity storage system 330 may also be configured to receive electric power that is generated by the electricity generator 342 and to store the electric energy. In the present embodiment, the electricity storage system 330 is also configured to supply the electric energy stored in the electricity storage system 330 to the electric motor 346. The electricity storage system 330 includes, for example, a battery, an inverter, a controller, and the like.

In the present embodiment, the power system 340 is configured to generate the drive force for the vehicle 100. The power system 340 may also be configured to generate the drive force for the vehicle 100 by mixing outputs of the internal combustion engine 344 and the electric motor 346 with any ratio. For example, the power system 340 may be configured to mix outputs of the internal combustion engine 344 and the electric motor 346 with a ratio determined by an operation mode of the vehicle 100. Note that, the vehicle 100 may be driven by an output from any one of the internal combustion engine 344 and the electric motor 346, depending on the operation mode of the vehicle 100.

In the present embodiment, the power system 340 is configured to generate the braking force by regeneration. The power system 340 may also be configured to generate the braking force for the vehicle 100 by mixing a braking force by an engine brake of the internal combustion engine 344 and a braking force by regeneration of the electric motor 346 with any ratio. For example, the power system 340 may be configured to mix the braking forces of the internal combustion engine 344 and the electric motor 346 with a ratio determined by the operation mode of the vehicle 100. Note that, the vehicle 100 may be braked by the braking force from any one of the internal combustion engine 344 and the electric motor 346, depending on the operation mode of the vehicle 100.

In the present embodiment, the electricity generator 342 is configured to supply the energy to the wheels 320. The electricity generator 342 is configured to generate electricity by using the internal combustion engine 344. More specifically, the electricity generator 342 is configured to convert power generated by the internal combustion engine 344 into electric power. The electricity generator 342 may also be configured to supply the generated electric power to the electric motor 346.

In the present embodiment, the internal combustion engine 344 is configured to supply the energy to the wheels 320. The internal combustion engine 344 is configured to convert chemical energy of fuel into the kinetic energy of the vehicle 100. Thereby, the drive force for the vehicle 100 is generated. The internal combustion engine 344 is also configured to generate the braking force by the engine brake.

In the present embodiment, the internal combustion engine 344 is configured to supply the energy to the wheels 320 via the electricity generator 342. Specifically, the internal combustion engine 344 is configured to supply the energy generated by the internal combustion engine 344 to the electricity generator 342. As described above, the electricity generator 342 is configured to convert the power generated by the internal combustion engine 344 into electric power, and to supply the electric power to the electric motor 346. Although described in detail later, the electric motor 346 is configured to rotate the wheels 320 by using the electric power supplied from the electricity generator 342. Note that, in another embodiment, the internal combustion engine 344 may also be configured to supply the energy to the wheels 320 by directly supplying the energy generated by the internal combustion engine 344 to the power transmission system 350.

In the present embodiment, the internal combustion engine 344 has a plurality of operation modes. Examples of the operation mode include (i) an operation mode (which may also be referred to as a high-efficiency operation mode) in which the rotation number and torque of the internal combustion engine 344 are adjusted taking into account a fuel efficiency of the internal combustion engine 344, (ii) an operation mode (which may also be referred to as a pseudo stepped shifting mode) in which the rotation number and torque of the internal combustion engine 344 are adjusted so that the vehicle 100 changes speed in a pseudo stepped shifting manner, and the like.

In the high-efficiency operation mode, the rotation number of the internal combustion engine 344 is adjusted so that an efficiency of the internal combustion engine 344 when the internal combustion engine 344 outputs power is equal to or greater than a predetermined value or is greater than the predetermined value. Note that, in the high-efficiency operation mode, the rotation number and torque of the internal combustion engine 344 may also be adjusted so that the efficiency of the internal combustion engine 344 when the internal combustion engine 344 outputs power is equal to or greater than the predetermined value or is greater than the predetermined value. Thereby, an output of the internal combustion engine 344 can be controlled so that the internal combustion engine 344 realizes a high fuel efficiency, with respect to an output requested for the internal combustion engine 344.

In the pseudo stepped shifting mode, the rotation number of the internal combustion engine 344 is changed within a predetermined range so that the vehicle 100 changes speed in the pseudo stepped shifting manner Note that, in the pseudo stepped shifting mode, each of the rotation number and torque of the internal combustion engine 344 can also be changed within a predetermined range so that the vehicle 100 changes speed in the pseudo stepped shifting manner. Thereby, an output of the internal combustion engine 344 can be controlled so that the vehicle 100 changes speed in the pseudo stepped shifting manner, with respect to an output requested for the internal combustion engine 344.

The rotation number and torque of the internal combustion engine 344 are controlled by the motion control ECU 390 arranged in the control system 150, for example. The motion control ECU 390 will be described in detail.

Note that, even when the operation mode of the internal combustion engine 344 changes from the high-efficiency operation mode to the pseudo stepped shifting mode, the output itself of the internal combustion engine 344 or the output itself of the electricity generator 342 does not greatly vary. For this reason, the change of the operation mode of the internal combustion engine 344 does not highly affect the output of the vehicle 100.

In one embodiment, the internal combustion engine 344 is configured to operate in an operation mode that is determined by a setting input to the instrument panel 240 by the user. In another embodiment, in a case where the internal combustion engine 344 operates in the high-efficiency operation mode, for example, the internal combustion engine 344 shifts to the pseudo stepped shifting mode when a requested output indicated by an amount of depression of the accelerator pedal 226 is equal to or larger than a predetermined value and the rotation number of the internal combustion engine 344 necessary to implement the requested output is equal to or larger than a predetermined value.

In the present embodiment, the electric motor 346 is configured to supply the energy to the wheels 320. The electric motor 346 is configured to supply the energy to the wheels 320 by using the electric energy that is supplied from at least one of the internal combustion engine 344 and/or the electricity storage system 330, for example. The electric motor 346 is configured to convert the electric energy that is supplied as a result of discharging of the electricity storage system 330 into the kinetic energy of the vehicle 100. Thereby, the drive force for the vehicle 100 is generated. The electric motor 346 may also be configured to generate the drive force for the vehicle 100 by using the electric power supplied from the electricity generator 342.

The electric motor 346 is also configured to generate the braking force by a regenerative brake. The electric motor 346 may also be configured to charge the electricity storage system 330 by the regenerative energy generated as a result of the conversion of the kinetic energy of the vehicle 100 into the electrical energy.

In the present embodiment, the power transmission system 350 is configured to transmit the drive force generated by the power system 340 to the wheels 320. For example, the power transmission system 350 is configured to transmit, to the wheels 320, the energy output by at least one of the internal combustion engine 344 and/or the electric motor 346. Examples of the power transmission system 350 include a transmission, a shaft, a belt and a combination thereof.

In the present embodiment, the mechanical brake 360 is configured to generate the braking force. Examples of the mechanical brake 360 include a mechanical brake, a hydraulic brake, an air pressure brake, an air-hydraulic hybrid brake, an exhaust brake, and the like. The mechanical brake 360 may also be configured to generate the braking force by cooperating with the power system 340.

For example, the control system 150 is configured to determine the braking force by the power system 340 and the braking force by the mechanical brake 360, based on a setting relating to a magnitude of the braking force by regeneration set by the paddle shift 224 and a braking operation amount input from the brake pedal 228. The power system 340 and the mechanical brake 360 are configured to generate the braking force, in response to an instruction from the control system 150. Thereby, the power system 340 and the mechanical brake 360 can generate the braking force in cooperation with each other.

As described above, in the present embodiment, the motion control ECU 390 is configured to control the rotation number and torque of the internal combustion engine 344. For example, the motion control ECU 390 is configured to adjust setting values of the rotation number and torque of the internal combustion engine 344, according to the operation mode of the internal combustion engine 344.

In the present embodiment, the rotation number setting unit 392 is configured to set a target value of the rotation number of the internal combustion engine 344. The rotation number setting unit 392 is configured to acquire, from the input/output system 120, information indicative of a setting relating to the operation mode of the vehicle 100 input to the instrument panel 240 by the user, for example. The rotation number setting unit 392 is also configured to acquire, from the input/output system 120, information indicative of the amount of depression of the accelerator pedal 226, for example.

The rotation number setting unit 392 is configured to decide a target value of the rotation number of the internal combustion engine 344 corresponding to an operation mode of the vehicle 100 input by the user, by referring to information indicative of the target value of the rotation number of the internal combustion engine 344 in each of the one or more operation modes of the internal combustion engine 344, for example. The rotation number setting unit 392 may also be configured to decide the target value of the rotation number of the internal combustion engine 344 corresponding to (i) an operation mode of the vehicle 100 input by the user and (ii) an output requested for the internal combustion engine 344, by referring to information indicative of a correspondence between a requested output for the internal combustion engine 344 and a target value of the rotation number of the internal combustion engine 344 in each of the one or more operation modes of the internal combustion engine 344. Thereby, the target value of the rotation number of the internal combustion engine 344 can be set according to the operation mode of the vehicle 100.

The rotation number setting unit 392 is also configured to acquire information indicative of a measurement result of the rotation number of the internal combustion engine 344, from the sensing system 140. The rotation number setting unit 392 may also be configured to control an operation of the internal combustion engine 344 so that the rotation number of the internal combustion engine 344 is close to the target value.

In the present embodiment, the torque setting unit 394 is configured to set a target value of the torque of the internal combustion engine 344. The torque setting unit 394 is configured to acquire, from the input control ECU 520, information indicative of a setting relating to the operation mode of the vehicle 100 input to the instrument panel 240 by the user, for example. The torque setting unit 394 is also configured to acquire, from the input control ECU 520, information indicative of the amount of depression of the accelerator pedal 226, for example.

The torque setting unit 394 is configured to decide a target value of the torque of the internal combustion engine 344 corresponding to an operation mode of the vehicle 100 input by the user by referring to information indicative of the target value of the torque of the internal combustion engine 344 in each of the one or more operation modes of the internal combustion engine 344, for example. The torque setting unit 394 may also be configured to decide the target value of the torque of the internal combustion engine 344 corresponding to (i) an operation mode of the vehicle 100 input by the user and (ii) an output requested for the internal combustion engine 344 by referring to information indicative of a correspondence between a requested output for the internal combustion engine 344 and a target value of the torque of the internal combustion engine 344 in each of the one or more operation modes of the internal combustion engine 344. Thereby, the target value of the torque of the internal combustion engine 344 can be set according to the operation mode of the vehicle 100.

The torque setting unit 394 is also configured to acquire information indicative of an estimation result of the torque of the internal combustion engine 344, from the sensing system 140. The torque setting unit 394 may also be configured to control an operation of the internal combustion engine 344 so that the torque of the internal combustion engine 344 is close to the target value.

Note that, in the present embodiment, the motion control ECU 390 may also be configured to control an operation of the electricity storage system 330. For example, the motion control ECU 390 is configured to control an operation of the electricity storage system 330, based on the amount of depression of the accelerator pedal 226. The motion control ECU 390 may also be configured to control an operation of the electricity storage system 330, based on (i) the amount of depression of the accelerator pedal 226 and (ii) a magnitude of electric power that is requested from an auxiliary device of the vehicle, an on-board battery, and the like. The motion control ECU 390 may also be configured to acquire a variety of information about the electricity storage system 330.

In the present embodiment, the motion control ECU 390 may also be configured to control an operation of the mechanical brake 360. For example, the motion control ECU 390 is configured to control an operation of the mechanical brake 360, based on the amount of depression of the brake pedal 228. The motion control ECU 390 may also be configured to acquire a variety of information about the mechanical brake 360.

The wheels 320 may be an example of the drive wheels. The electricity storage system 330 may be an example of the electricity storage device. The internal combustion engine 344 may be an example of the engine. The high-efficiency operation mode may be an example of the first mode. The pseudo stepped shifting mode may be an example of the second mode.

Figure 4:
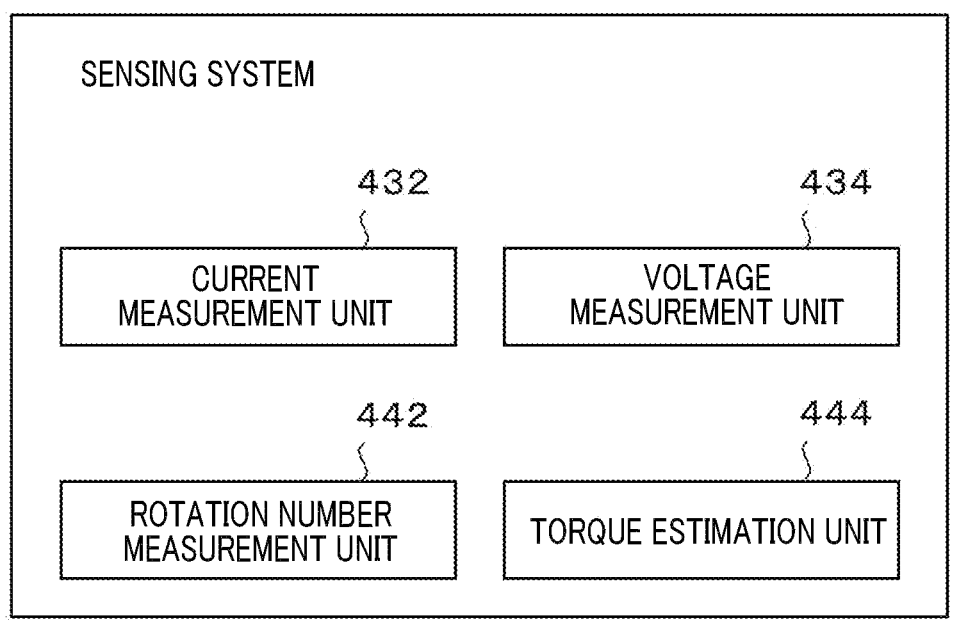
FIG. 4 schematically shows an example of an internal configuration of a sensing system 140.

FIG. 4 schematically shows an example of an internal configuration of the sensing system 140. In the present embodiment, the sensing system 140 includes a current measurement unit 432, a voltage measurement unit 434, a rotation number measurement unit 442, and a torque estimation unit 444.

In the present embodiment, the current measurement unit 432 is configured to measure a magnitude of current in an input/output terminal of the electricity storage system 330. The voltage measurement unit 434 is configured to measure a magnitude of voltage in the input/output terminal of the electricity storage system 330. The current measurement unit 432 and the voltage measurement unit 434 may also be each configured to output information indicative of a measurement result to the control system 150. Thereby, the control system 150 can decide the output electric power and/or the regenerative electric power of the electricity storage system 330.

In the present embodiment, the current measurement unit 432 may also be configured to measure a magnitude of supply current to the electric motor 346. The voltage measurement unit 434 may also be configured to measure a magnitude of supply voltage to the electric motor 346. The current measurement unit 432 and the voltage measurement unit 434 may be each configured to output information indicative of a measurement result to the control system 150. Thereby, the control system 150 can calculate supply electric power to the electric motor 346.

In the present embodiment, the rotation number measurement unit 442 is configured to measure the rotation number of the internal combustion engine 344. The rotation number measurement unit 442 may be configured to output information indicative of a measurement result to the control system 150.

In the present embodiment, the torque estimation unit 444 is configured to measure the torque of the internal combustion engine 344. For example, the torque estimation unit 444 is configured to measure an amount of intake air, an amount of fuel injection and the like of the internal combustion engine 344. The torque estimation unit 444 is configured to estimate the torque of the internal combustion engine 344, based on measurement results of an amount of intake air, an amount of fuel injection and the like of the internal combustion engine 344. The torque estimation unit 444 may be configured to output information indicative of an estimation result to the control system 150.

Figure 5:
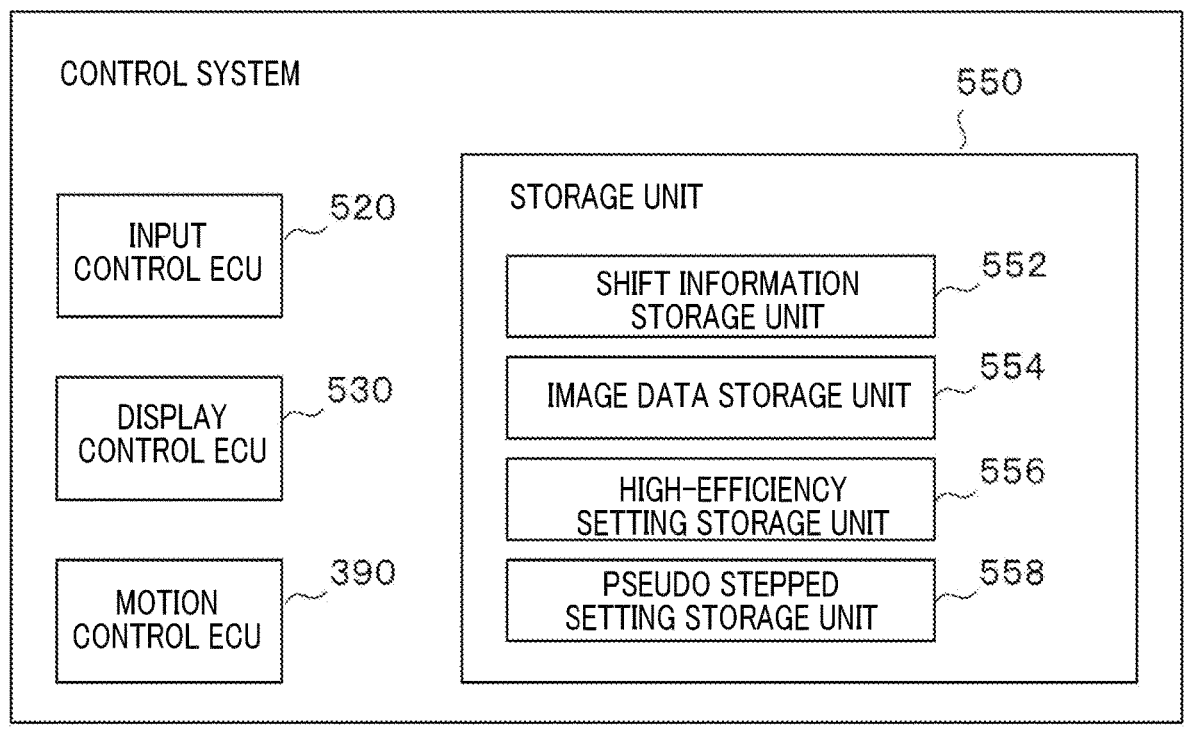
FIG. 5 schematically shows an example of an internal configuration of a control system 150.

FIG. 5 schematically shows an example of an internal configuration of the control system 150. In the present embodiment, the control system 150 includes an input control ECU 520, a display control ECU 530, a motion control ECU 390, and a storage unit 550. In the present embodiment, the storage unit 550 includes a shift information storage unit 552, and an image data storage unit 554.

In the present embodiment, the input control ECU 520 is configured to control information input to the control system 150. For example, the input control ECU 520 is configured to acquire, from the input/output system 120, information (also referred to as input information) indicative of a user's instruction or operation received by the input/output system 120. The input control ECU 520 may also be configured to acquire, from the sensing system 140, information indicative of a measurement result of a physical quantity relating to the state of the vehicle 100 measured by the sensing system 140. The input control ECU 520 will be described in detail later.

In the present embodiment, the display control ECU 530 is configured to control at least one of the mechanical instrument 242 and the display device 250. The display control ECU 530 may be configured to control information display on the mechanical instrument 242 or control information display on the display device 250. The display control ECU 530 may also be configured to control an operation of a pointer for indicating a value of an index relating to the state of the vehicle 100, in the mechanical instrument 242. The display control ECU 530 may also be configured to control at least one of a display content and a display aspect of the instrument image 252, in the display device 250.

For example, the display control ECU 530 is configured to acquire, from the input control ECU 520, a variety of information about the state of the vehicle 100. The display control ECU 530 is configured to determine values of diverse indexes relating to the state of the vehicle 100, based on the information acquired by the input control ECU 520. For example, the display control ECU 530 is configured to calculate values of diverse indexes relating to the state of the vehicle 100 from the information acquired by the input control ECU 520, based on predetermined calculation equations, functions or algorithms.

The display control ECU 530 may be configured to control display of at least one of the mechanical instrument 242 and the display device 250, based on the values of the diverse indexes. For example, the display control ECU 530 causes at least one of the mechanical instrument 242 and the display device 250 to display present values of the diverse indexes. When information about a variety of settings relating to the vehicle 100 is included in the information acquired by the input control ECU 520, the display control ECU 530 may cause at least one of the mechanical instrument 242 and the display device 250 to display information indicative of contents of the settings. The display control ECU 530 will be described in detail.

In the present embodiment, the motion control ECU 390 is configured to control motion of the vehicle 100. The motion control ECU 390 may also be configured to control motion of the vehicle 100 by controlling the vehicle motion system 130 based on the input information acquired from the input control ECU 520.

In the present embodiment, a variety of information is stored in the storage unit 550. A variety of information that is used in the information processing in the control system 150 may also be stored in the storage unit 550. A variety of information that is generated in the information processing in the control system 150 may also be stored in the storage unit 550.

In the present embodiment, a variety of information relating to a setting of the paddle shift 224 is stored in the shift information storage unit 552. For example, in the shift information storage unit 552, each of a plurality of settings relating to the braking force by regeneration for the vehicle 100 is stored in association with a value of deceleration when the setting is selected.

In the shift information storage unit 552, information indicative of relations among the plurality of settings may also be stored. For example, when a specific setting is selected, information relating to other settings that the user can select is stored in the shift information storage unit 552. Note that, the plurality of settings may include a setting corresponding to a case where the paddle shift 224 is not operated as well as a setting corresponding to a case where the paddle shift 224 is operated.

In the present embodiment, the image data storage unit 554 stores a variety of image data that is used in the information processing in the display control ECU 530. For example, the image data storage unit 554 stores information about a variety of objects that are used for the display control ECU 530 to generate the instrument image 252. Examples of the object include (i) an icon of a dashboard, (ii) icons arranged on or around the dashboard so as to indicate present states of the diverse indexes, (iii) icons arranged on or around the dashboard so as to indicate present states of the diverse settings, and the like.

In the present embodiment, the high-efficiency setting storage unit 556 stores information about target values of the rotation number and torque of the internal combustion engine 344 when the operation mode of the vehicle 100 is the high-efficiency operation mode. The high-efficiency setting storage unit 556 may also store information indicative of a correspondence between a requested output for the internal combustion engine 344 and target values of the rotation number and torque of the internal combustion engine 344. The information indicative of the correspondence may be a data table or a function.

In the present embodiment, the pseudo stepped setting storage unit 558 stores information about target values of the rotation number and torque of the internal combustion engine 344 when the operation mode of the vehicle 100 is the pseudo stepped shifting mode. The pseudo stepped setting storage unit 558 may also store information indicative of a correspondence between a requested output for the internal combustion engine 344 and target values of the rotation number and torque of the internal combustion engine 344. The information indicative of the correspondence may be a data table or a function.

The present states of the diverse settings may include a state (which may also be referred to as a rejection state) of rejecting receiving an instruction or input. Examples of the rejection state include a state of rejecting receiving an instruction or input for shifting to an EV priority traveling mode, a state of rejecting receiving an instruction or input for shifting to a specific stage of a deceleration paddle indicated by the paddle shift 224, and the like.

The display control ECU 530 may be an example of the control device. Note that, in another embodiment, the motion control ECU 390 may have some of the functions of the display control ECU 530 of the present embodiment. In this case, the motion control ECU 390 may be an example of the motor output decision unit, the first rotation number decision unit or the second rotation number decision unit, for example. At this time, the display control ECU 530 may be an example of the display value decision unit or the display control unit.

Figure 6:
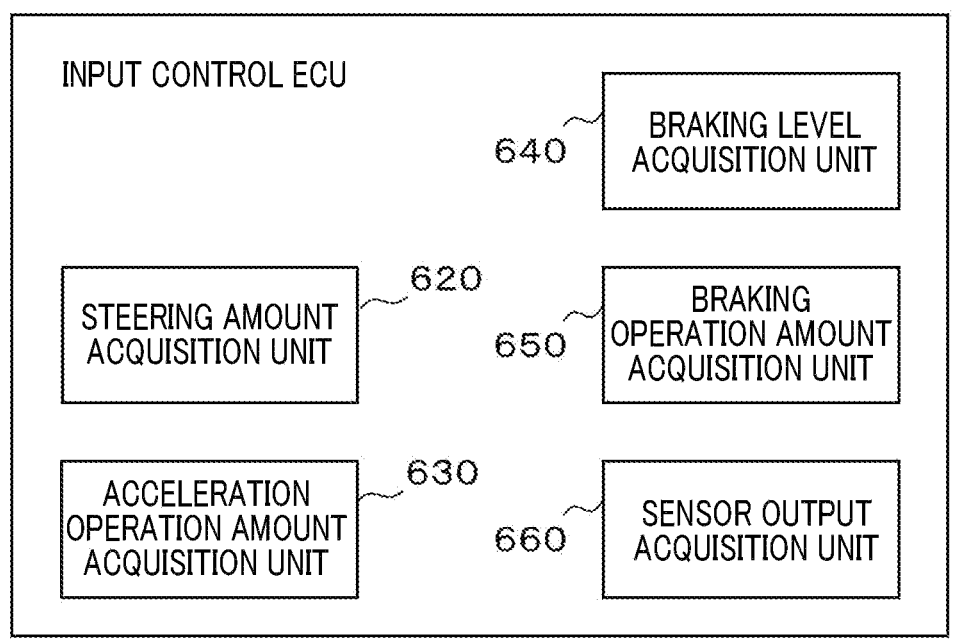
FIG. 6 schematically shows an example of an internal configuration of an input control ECU 520.

FIG. 6 schematically shows an example of an internal configuration of the input control ECU 520. In the present embodiment, the input control ECU 520 includes a steering amount acquisition unit 620, an acceleration operation amount acquisition unit 630, a braking level acquisition unit 640, a braking operation amount acquisition unit 650, and a sensor output acquisition unit 660.

In the present embodiment, the steering amount acquisition unit 620 is configured to acquire information indicative of a steering amount received by a steering wheel 222. In the present embodiment, the acceleration operation amount acquisition unit 630 is configured to acquire information indicative of an acceleration operation amount received by the accelerator pedal 226. In the present embodiment, the braking level acquisition unit 640 is configured to acquire information indicative of a content or change of a setting relating to a magnitude of the braking force by regeneration received by the paddle shift 224. For example, the braking level acquisition unit 640 is configured to acquire information indicative of a present setting of a plurality of settings relating to the magnitude of the braking force by regeneration. In the present embodiment, the braking operation amount acquisition unit 650 is configured to acquire information indicative of a braking operation amount received by the brake pedal 228.

In the present embodiment, the sensor output acquisition unit 660 is configured to acquire information indicative of measurement results of a variety of physical quantities from the sensing system 140. For example, the sensor output acquisition unit 660 is configured to acquire information indicative of a measurement result or an estimation result on an input and an output of power of the vehicle motion system 130. For example, the sensor output acquisition unit 660 is configured to acquire information indicative of a measurement result of a voltage and a current that are supplied to the electric motor 346, from the current measurement unit 432 and the voltage measurement unit 434. The sensor output acquisition unit 660 is configured to acquire information indicative of a measurement result of the rotation number of the internal combustion engine 344 from the rotation number measurement unit 442. The sensor output acquisition unit 660 is configured to acquire information indicative of an estimation result of the torque of the internal combustion engine 344 from the torque estimation unit 444.

The sensor output acquisition unit 660 may also be configured to acquire information indicative of a measurement result on the braking force of the vehicle motion system 130. The sensor output acquisition unit 660 may also be configured to acquire information indicative of a measurement result on the braking force by regeneration of the vehicle motion system 130.

Figure 7:
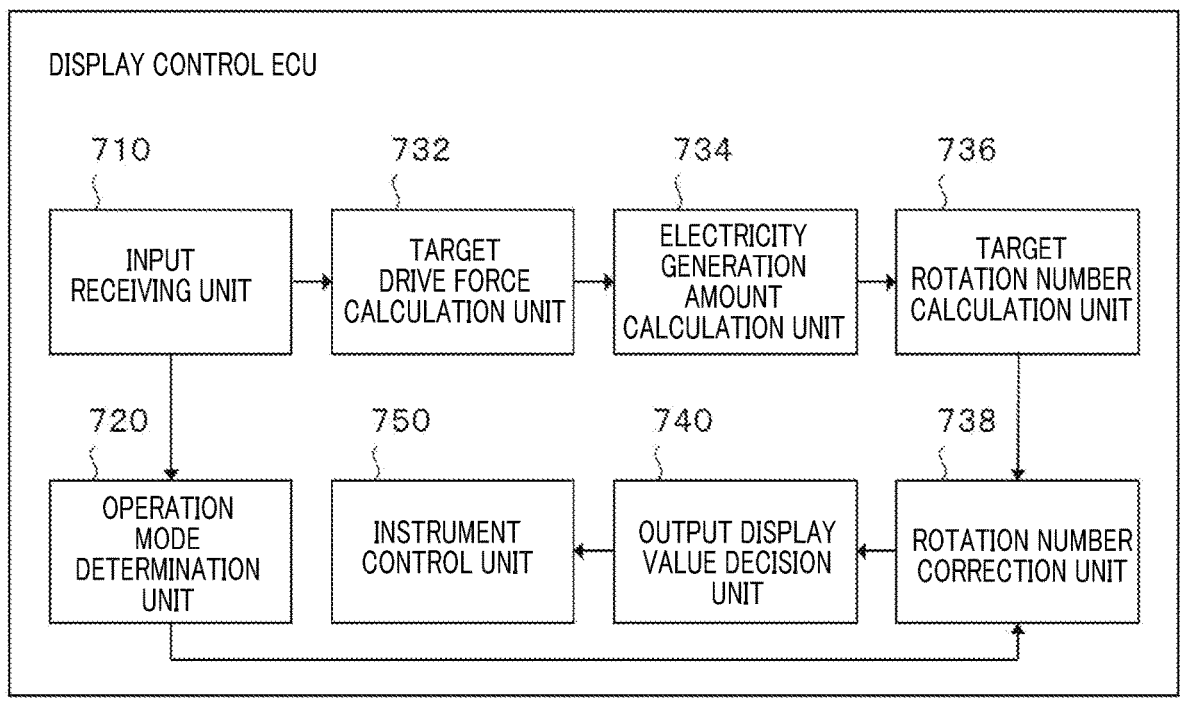
FIG. 7 schematically shows an example of an internal configuration of a display control ECU 530.

FIG. 7 schematically shows an example of an internal configuration of the display control ECU 530. In the present embodiment, the display control ECU 530 is described in detail with reference to an example where the instrument panel 240 presents the user of the vehicle 100 with a magnitude of power that is supplied from the electricity storage system 330 and the internal combustion engine 344 to the wheels 320.

In the present embodiment, the display control ECU 530 includes, for example, an input receiving unit 710 and an operation mode determination unit 720. In the present embodiment, the display control ECU 530 includes, for example, a target drive force calculation unit 732, an electricity generation amount calculation unit 734, a target rotation number calculation unit 736, a rotation number correction unit 738, an output display value decision unit 740, and an instrument control unit 750.

In the present embodiment, the input receiving unit 710 is configured to receive a variety of inputs from the user. In one embodiment, the input receiving unit 710 is configured to acquire information indicative of an acceleration operation amount received by the accelerator pedal 226, from the acceleration operation amount acquisition unit 630 of the input control ECU 520. In another embodiment, the input receiving unit 710 is configured to acquire information indicative of a setting relating to an operation mode of the vehicle 100 input to the instrument panel 240 by the user, from the input control ECU 520.

The input receiving unit 710 is configured to output the information indicative of the acceleration operation amount to the target drive force calculation unit 732, for example. The input receiving unit 710 is configured to output the information indicative of the setting relating to the operation mode of the vehicle 100 to the operation mode determination unit 720, for example.

In the present embodiment, the operation mode determination unit 720 is configured to determine the operation mode of the vehicle 100. In one embodiment, the operation mode determination unit 720 is configured to determine the operation mode of the vehicle 100, based on the setting relating to the operation mode of the vehicle 100. In another embodiment, the operation mode determination unit 720 is configured to decide to set the pseudo stepped shifting mode as the operation mode of the vehicle 100 when the output of the internal combustion engine 344 decided by the electricity generation amount calculation unit 734 is equal to or larger than a predetermined first threshold value and the target value of the rotation number of the internal combustion engine 344 decided by the target rotation number calculation unit 736 is equal to or larger than a predetermined second threshold value.

When the operation mode of the vehicle 100 is changed from the high-efficiency operation mode to the pseudo stepped shifting mode, the operation mode of the internal combustion engine 344 is changed from the high-efficiency operation mode to the pseudo stepped shifting mode. Thereby, the rotation number and torque of the internal combustion engine 344 are adjusted so that the vehicle 100 changes speed in the pseudo stepped shifting manner. The instrument control unit 750 is configured to change a power display method on the instrument panel 240.

In the present embodiment, the target drive force calculation unit 732 is configured to decide a target value of the drive force that is requested to be supplied to the wheels 320, based on the amount of depression of the accelerator pedal 226, for example. The target drive force calculation unit 732 may also be configured to decide the target value of the drive force, based on a degree of opening of the accelerator pedal 226 and a speed of the vehicle 100. The target drive force calculation unit 732 is configured to output information indicative of the target value of the drive force to the electricity generation amount calculation unit 734, for example.

More specifically, the target drive force calculation unit 732 is configured to acquire the information indicative of the acceleration operation amount decided based on the amount of depression of the accelerator pedal 226, from the input receiving unit 710. The target drive force calculation unit 732 is configured to calculate a drive force that is requested so as to accelerate the vehicle 100 in conformity to the acceleration operation amount, based on a predetermined algorithm, for example.

In the present embodiment, the electricity generation amount calculation unit 734 is configured to decide a target value of the electricity generation amount of the electricity generator 342. The electricity generation amount calculation unit 734 is configured to decide the target value of the electricity generation amount of the electricity generator 342, based on the amount of depression of the accelerator pedal 226, for example. The electricity generation amount calculation unit 734 may also be configured to decide the target value of the electricity generation amount of the electricity generator 342, based on (i) the amount of depression of the accelerator pedal 226 and (ii) a magnitude of electric power that is requested from an auxiliary device of the vehicle, an on-board battery, and the like. The electricity generation amount calculation unit 734 is configured to output information indicative of the target value of the electricity generation amount to the target rotation number calculation unit 736, for example.

More specifically, the electricity generation amount calculation unit 734 is configured to acquire information indicative of the target value of the drive force from the target drive force calculation unit 732. The electricity generation amount calculation unit 734 is configured to calculate an electricity generation amount of the electricity generator 342 that is requested to match the drive force supplied to the wheels 320 with the target value of the drive force, based on a predetermined algorithm, for example. For example, the electricity generation amount calculation unit 734 is configured to decide the target value of the electricity generation amount of the electricity generator 342, based on (i) the target value of the drive force, (ii) a load of an auxiliary device of the vehicle, target values of charging and discharging of the electricity storage system 330, and the like.

In the present embodiment, the target rotation number calculation unit 736 is configured to decide the target value of the rotation number of the internal combustion engine 344. The target rotation number calculation unit 736 may also be configured to decide the rotation number of the internal combustion engine 344 in the high-efficiency operation mode. The target rotation number calculation unit 736 is configured to output information indicative of the target value of the rotation number to the rotation number correction unit 738, for example.

More specifically, the target rotation number calculation unit 736 is configured to acquire information indicative of the target value of the electricity generation amount from the electricity generation amount calculation unit 734. The target rotation number calculation unit 736 is configured to decide the rotation number and torque of the internal combustion engine 344 so that the efficiency of the internal combustion engine 344 is to satisfy a predetermined condition, based on a predetermined algorithm, for example.

In the present embodiment, the rotation number correction unit 738 is configured to correct the target value of the rotation number of the internal combustion engine 344. The rotation number correction unit 738 may also be configured to correct the target value of the rotation number calculated by the target rotation number calculation unit 736, thereby deciding a target value of the rotation number of the internal combustion engine 344 (which may also be referred to as a correction value of the rotation number) in the pseudo stepped shifting mode. The rotation number correction unit 738 is configured to output information indicative of the correction value of the rotation number to the output display value decision unit 740, for example.

More specifically, the rotation number correction unit 738 is configured to acquire information indicative of the target value of the rotation number from the target rotation number calculation unit 736. The rotation number correction unit 738 is configured to correct the target value of the rotation number calculated by the target rotation number calculation unit 736 based on a predetermined algorithm for example, thereby calculating the target value of the rotation number of the internal combustion engine 344 in the pseudo stepped shifting mode.

In the present embodiment, the output display value decision unit 740 is configured to decide a display value indicative of a magnitude of power that is displayed on the instrument panel 240. The output display value decision unit 740 may also be configured to change a display value decision method in the high-efficiency operation mode and in the pseudo stepped shifting mode.

In the high-efficiency operation mode, the output display value decision unit 740 is configured to decide the display value, based on the present value or the target value of power that is supplied to the wheels 320 by the drive system 372. The output display value decision unit 740 may also be configured to calculate the target value of power that is supplied to the wheels 320 by the drive system 372, based on the electricity generation amount of the electricity generator 342 decided by the electricity generation amount calculation unit 734.

In the high-efficiency operation mode, the output display value decision unit 740 may also be configured to decide, as the display value, the present value of power that is supplied to the wheels 320 by the drive system 372. The output display value decision unit 740 may also be configured to decide, as the display value, a ratio of the present value of power that is supplied to the wheels 320 by the drive system 372 to a maximum value or a rated value of power that can be supplied to the wheels 320 by the drive system 372.

On the other hand, in the pseudo stepped shifting mode, the output display value decision unit 740 is configured to decide the display value, taking into account the rotation number of the internal combustion engine 344. For example, the output display value decision unit 740 is configured to decide the display value in the pseudo stepped shifting mode, based on the correction number of the rotation number of the internal combustion engine 344 decided by the rotation number correction unit 738.

The output display value decision unit 740 may also be configured to decide the display value in the pseudo stepped shifting mode, based on (i) a magnitude of the drive energy amount and (ii) a ratio of a difference between the target value of the rotation number decided by the target rotation number calculation unit 736 and the correction value of the rotation number decided by the rotation number correction unit 738 to a maximum rotation number or a rated rotation number of the internal combustion engine 344. The output display value decision unit 740 may also be configured to decide the display value in the pseudo stepped shifting mode, based on (i) a magnitude of the drive energy amount and (ii) a ratio of an absolute value of the difference between the target value of the rotation number decided by the target rotation number calculation unit 736 and the correction value of the rotation number decided by the rotation number correction unit 738 to the maximum rotation number or the rated rotation number of the internal combustion engine 344.

In one embodiment, when (i) the maximum value or the rated value of power that can be supplied to the wheels 320 by the drive system 372 is denoted as A, (ii) the present value or the target value of power that is supplied to the wheels 320 by the drive system 372 is denoted as B, (iii) the maximum value or the rated value of the rotation number of the internal combustion engine 344 is denoted as C, (iv) the target value of the rotation number of the internal combustion engine 344 is denoted as D and (v) the correction value of the rotation number of the internal combustion engine 344 is denoted as E, the output display value decision unit 740 decides the display value V by a following equation (1), for example. display value $V=B-(D-E)/C \times A$ (equation 1)

In another embodiment, the output display value decision unit 740 may decide the display value V by a following equation (2), for example.

$$\text{display value } V=B/A-(D-E)/C \quad \text{(equation 2)}$$

Note that, as described above, the correction value of the rotation number of the internal combustion engine 344 decided by the rotation number correction unit 738 is decided based on the target value of the rotation number of the internal combustion engine 344 decided by the target rotation number calculation unit 736. For this reason, the output display value decision unit 740 can decide the display value, based on the target value of the rotation number of the internal combustion engine 344 decided by the target rotation number calculation unit 736.

In the present embodiment, the instrument control unit 750 is configured to control the instrument panel 240. The instrument control unit 750 may also be configured to control a display operation of the instrument panel 240. The instrument control unit 750 is configured to control the display operation of the instrument panel 240, based on the display value decided by the output display value decision unit 740. More specifically, the instrument control unit 750 is configured to control the display operation of the instrument panel 240 so that power displayed on the instrument panel 240 is to be the display value decided by the output display value decision unit 740. Thereby, the display method of the instrument panel 240 can be changed when the internal combustion engine 344 supplies power to the wheels 320 in the high-efficiency operation mode and when the internal combustion engine 344 supplies power to the wheels 320 in the pseudo stepped shifting mode.

The electricity generation amount calculation unit 734 may be an example of the motor output decision unit. The target rotation number calculation unit 736 may be an example of the first rotation number decision unit. The rotation number correction unit 738 may be an example of the second rotation number decision unit. The output display value decision unit 740 may be an example of the display value decision unit. The instrument control unit 750 may be an example of the display control unit. The drive force may be an example of the requested output. The target value of the drive force may be an example of the magnitude of the requested output. The electricity generation amount of the electricity generator 342 may be an example of the requested output. The electricity generation amount of the electricity generator 342 may also be an example of the electric energy amount that is generated by the electricity generator. The target value of the rotation number decided by the target rotation number calculation unit 736 may be an example of the first target value. The target value (correction number) of the rotation number decided by the rotation number correction unit 738 may be an example of the second target value.

In the present embodiment, the rotation number correction unit 738 has been described in detail with reference to the example where the rotation number correction unit 738 corrects the target value of the rotation number calculated by the target rotation number calculation unit 736, thereby calculating the target value of the rotation number of the internal combustion engine 344 in the pseudo stepped shifting mode, based on the predetermined algorithm, for example. However, the rotation number correction unit 738 is not limited to the present embodiment.

In another embodiment, the rotation number correction unit 738 may also be configured to decide the target value of the rotation number of the internal combustion engine 344 in the pseudo stepped shifting mode by using (i) information about the target values of the rotation number and torque of the internal combustion engine 344 or (ii) information indicative of a correspondence between the requested output for the internal combustion engine 344 and the target values of the rotation number and torque of the internal combustion engine 344, the information being stored in the pseudo stepped setting storage unit 558. For example, the rotation number correction unit 738 is configured to decide the requested output for the internal combustion engine 344, based on the amount of depression of the accelerator pedal 226. The rotation number correction unit 738 is configured to decide a target value of the rotation number of the internal combustion engine 344 in the pseudo stepped shifting mode, which corresponds to the requested output for the internal combustion engine 344 decided based on the amount of depression of the accelerator pedal 226, with reference to information indicative of a correspondence between the requested output for the internal combustion engine 344 and the target value of the rotation number of the internal combustion engine 344, the information being stored in the pseudo stepped setting storage unit 558.

Figure 8:
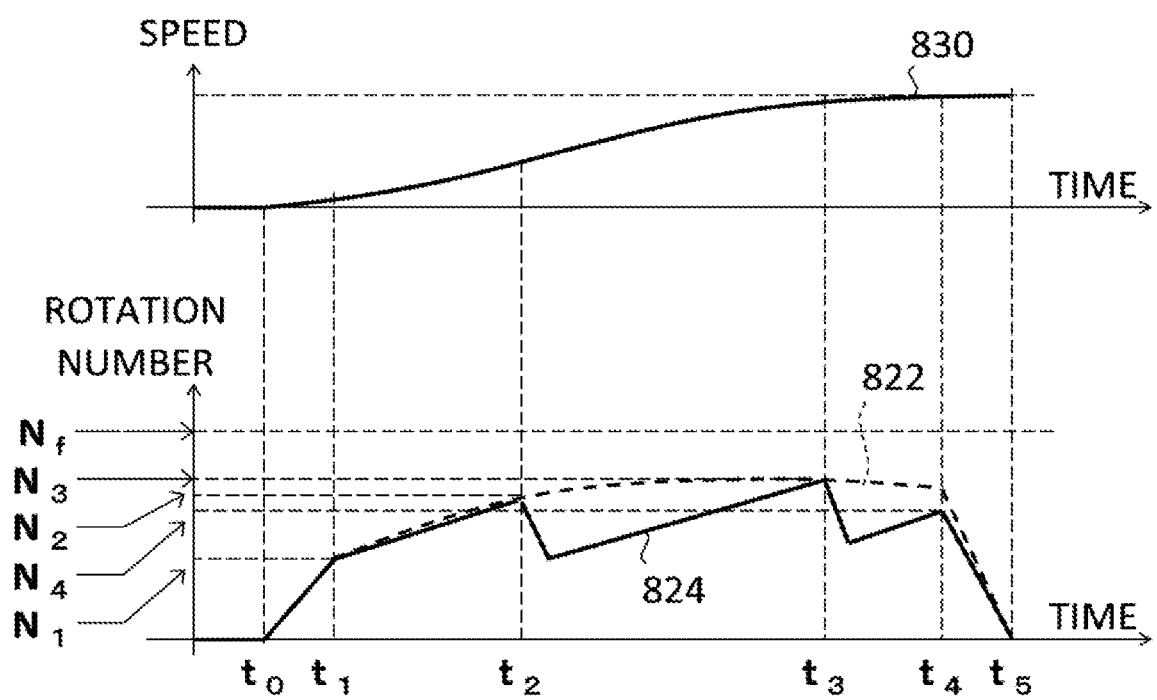
FIG. 8 schematically shows an example of information processing that is executed in a rotation number correction unit 738.

FIG. 8 schematically shows an example of information processing that is executed in the rotation number correction unit 738. FIG. 8 shows an example of a variation pattern of the rotation number of the internal combustion engine 344 when the vehicle 100 is accelerated in the pseudo stepped shifting mode during a time period from time t0 to time t5. As described above, a control target value 822 of the rotation number of the internal combustion engine 344 in the high-efficiency operation mode is decided according to the amount of depression of the accelerator pedal. On the other hand, as shown in FIG. 8, the control target value 822 of the rotation number of the internal combustion engine 344 in the pseudo stepped shifting mode is decided so that the rotation number varies as if the vehicle 100 changes speed in the stepped shifting manner, at time t1, time t2, time t3 and time t5. Thereby, a feeling of increase in a vehicle speed 830 of the vehicle 100 that is perceived by the user and a feeling of increase in the rotation number of the internal combustion engine 344 that is perceived by the user coincide with each other.

Figure 9:
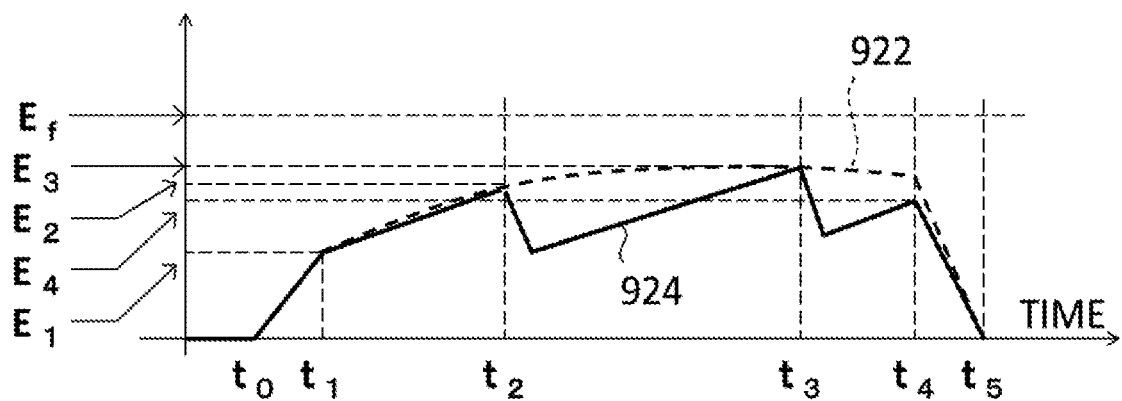
FIG. 9 schematically shows an example of information processing that is executed in an output display value decision unit 740.

FIG. 9 schematically shows an example of information processing that is executed in the output display value decision unit 740. In FIG. 9, a display value 922 in the high-efficiency operation mode shows a value of power that is displayed on the instrument panel 240 when the rotation number of the internal combustion engine 344 is controlled based on the control target value 822 described with reference to FIG. 8. On the other hand, a display value 924 in the pseudo stepped shifting mode shows a value of power that is displayed on the instrument panel 240 when the rotation number of the internal combustion engine 344 is controlled based on the control target value 824 described with reference to FIG. 8.

Thereby, according to the present embodiment, the feeling of increase in the vehicle speed 830 of the vehicle 100 that is perceived by the user, the feeling of increase in the rotation number of the internal combustion engine 344 that is perceived by the user and a feeling of increase in the value of power that is displayed on the instrument panel 240 coincide with each other. For this reason, the discomfort that the user feels while driving the vehicle 100 is greatly suppressed. As a result, the user can drive the vehicle 100 more safely.

Figure 10:
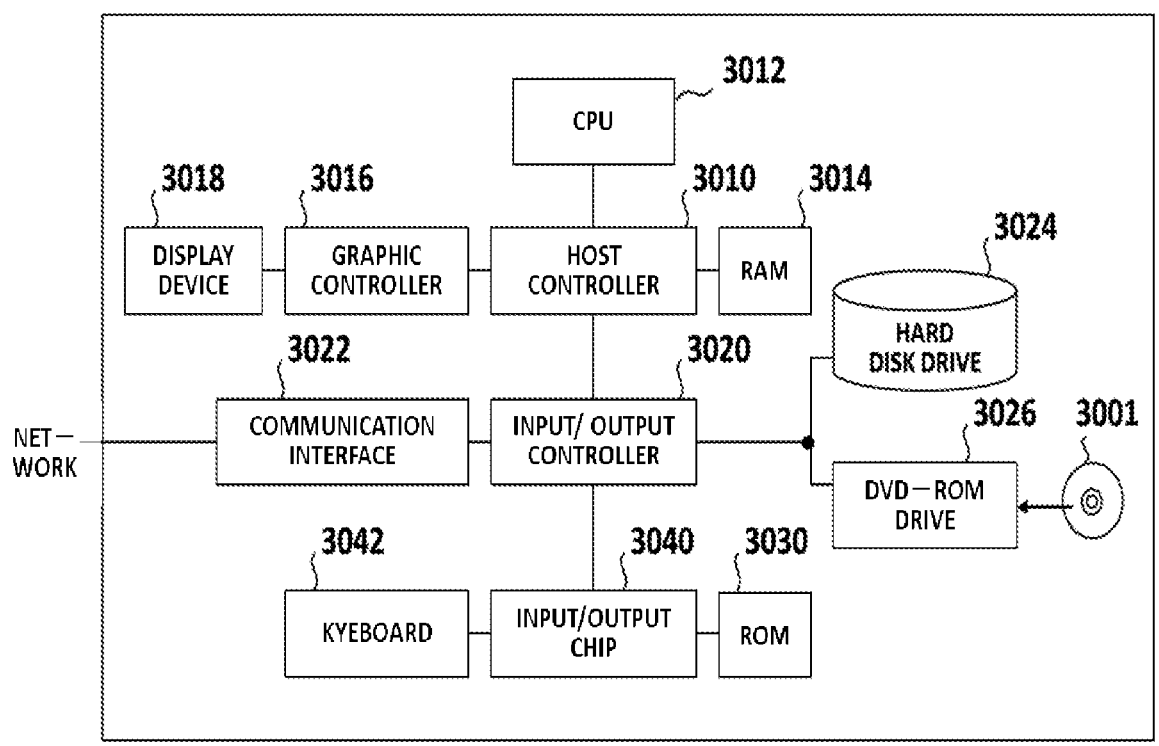
FIG. 10 schematically shows an example of a system configuration of a computer 3000.

FIG. 10 shows an example of a computer 3000 in which a plurality of aspects of the present invention may be entirely or partially embodied. A part of the vehicle 100 may be implemented by the computer 3000. For example, the control system 150 or a part thereof is implemented by the computer 3000.

A program that is installed in the computer 3000 can cause the computer 3000 to function as one or more "sections" in an operation or an apparatus associated with the embodiment of the present invention, or cause the computer 3000 to perform the operation or the one or more sections thereof, and/or cause the computer 3000 to perform processes of the embodiment of the present invention or steps thereof. Such program may be performed by a CPU 3012 so as to cause the computer 3000 to perform certain operations associated with some or all of the blocks of flowcharts and block diagrams described herein.

The computer 3000 according to the present embodiment includes a CPU 3012, a RAM 3014, a graphic controller 3016 and a display device 3018, which are mutually connected by a host controller 3010. The computer 3000 also includes input/output units such as a communication interface 3022, a hard disk drive 3024, a DVD-ROM drive 3026 and an IC card drive, which are connected to the host controller 3010 via an input/output controller 3020. The computer also includes legacy input/output units such as a ROM 3030 and a keyboard 3042, which are connected to the input/output controller 3020 via an input/output chip 3040.

The CPU 3012 is configured to operate, based on programs stored in the ROM 3030 and the RAM 3014, thereby controlling each unit. The graphic controller 3016 is configured to acquire image data, which is generated by the CPU 3012 on a frame buffer provided in the RAM 3014 or itself, and to cause the image data to be displayed on the display device 3018.

The communication interface 3022 is configured to perform communication with other electronic devices via a network. The hard disk drive 3024 is configured to store programs and data, which are used by the CPU 3012 within the computer 3000. The DVD-ROM drive 3026 is configured to read programs or data from a DVD-ROM 3001, and to provide the programs or data to the hard disk drive 3024 via the RAM 3014. The IC card drive is configured to read programs and data from an IC card, and/or to write programs and data to the IC card.

The ROM 3030 is configured to store a boot program that is performed by the computer 3000 at the time of activation, and/or a program depending on the hardware of the computer 3000. The input/output chip 3040 may be configured to connect a variety of input/output units to the input/output controller 3020 via a parallel port, a serial port, a keyboard port, a mouse port and the like.

A program is provided by a computer-readable storage medium such as a DVD-ROM 3001 or an IC card. The program is read from the computer-readable storage medium, is installed in the hard disk drive 3024, the RAM 3014 or the ROM 3030, which are examples of the computer-readable storage medium, and is executed by the CPU 3012. The information processing described in these programs is read into the computer 3000, resulting in cooperation between a program and the above-mentioned various types of hardware resources. An apparatus or method may be constituted by realizing the operation or processing of information in accordance with the usage of the computer 3000.

For example, when communication is performed between the computer 3000 and an external device, the CPU 3012 may execute a communication program loaded onto the RAM 3014 to instruct communication processing to the communication interface 3022, based on the processing described in the communication program. The communication interface 3022, under control of the CPU 3012, reads transmission data stored on a transmission buffer region provided on a recording medium such as the RAM 3014, the hard disk drive 3024, the DVD-ROM 3001 or the IC card, and transmits the read transmission data to a network or writes reception data received from a network into a reception buffer region or the like provided on the recording medium.

In addition, the CPU 3012 is configured to cause all or a necessary portion of a file or a database, which has been stored in an external recording medium such as the hard disk drive 3024, the DVD-ROM drive 3026 (DVD-ROM 3001), the IC card and the like, to be read into the RAM 3014, thereby performing various types of processing on the data on the RAM 3014. The CPU 3012 may be configured to write back the processed data to the external recording medium.

Various types of information, such as various types of programs, data, tables, and databases, may be stored in the recording medium to undergo information processing. The CPU 3012 may also be configured to perform various types of processing on the data read from the RAM 3014, which includes various types of operations, processing of information, condition judging, conditional branching, unconditional branching, search/replacement of information and the like described in the present embodiment and designated by an instruction sequence of programs, and to write the result back to the RAM 3014. In addition, the CPU 3012 may be configured to search for information in a file, a database, and the like in the recording medium. For example, when a plurality of entries, each having an attribute value of a first attribute associated with an attribute value of a second attribute, is stored in the recording medium, the CPU 3012 may search for an entry matching the condition whose attribute value of the first attribute is designated, from the plurality of entries, and read the attribute value of the second attribute stored in the entry, thereby obtaining the attribute value of the second attribute associated with the first attribute satisfying the predetermined condition.

The above-described programs or software modules may be stored on the computer 3000 or in a computer-readable storage medium in the vicinity of the computer 3000. In addition, a recording medium such as a hard disk or a RAM provided in a server system connected to a dedicated communication network or the Internet can be used as the computer-readable storage medium, thereby providing the programs to the computer 3000 via the network.

In the embodiment, the flowcharts and blocks of the block diagrams may represent steps of processes in which operations are performed or sections of apparatuses responsible for performing operations. Certain steps and sections may be implemented by dedicated circuitry, programmable circuitry supplied with computer-readable instructions stored on computer-readable storage media, and/or processors supplied with computer-readable instructions stored on computer-readable storage media. Dedicated circuitry may include digital and/or analog hardware circuits and may include integrated circuits (IC) and/or discrete circuits. Programmable circuitry may include, for example, reconfigurable hardware circuits comprising logical AND, OR, XOR, NAND, NOR, and other logical operations, flip-flops, registers, memory elements such as field-programmable gate arrays (FPGA), programmable logic arrays (PLA), and the like.

Computer-readable storage media may include any tangible device that can store instructions for execution by a suitable device, such that the computer-readable storage medium having instructions stored thereon comprises an article of manufacture including instructions which can be executed to create means for performing operations specified in the flowcharts or block diagrams. Examples of computer-readable storage media may include an electronic storage medium, a magnetic storage medium, an optical storage medium, an electromagnetic storage medium, a semiconductor storage medium, and the like. More specific examples of computer-readable storage media may include a floppy (registered trademark) disk, a diskette, a hard disk, a random access memory (RAM), a read-only memory (ROM), an erasable programmable read-only memory (EPROM or flash memory), an electrically erasable programmable read-only memory (EEPROM), a static random access memory (SRAM), a compact disc read-only memory (CD-ROM), a digital versatile disk (DVD), a BLU-RAY (registered trademark) disc, a memory stick, an integrated circuit card, and the like.

Computer-readable instructions may include assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, JAVA (registered trademark), C++, etc., and conventional procedural programming languages such as the "C" programming language or similar programming languages.

Computer-readable instructions may be provided to a processor of a general purpose computer, a special purpose computer, or other programmable data processing apparatus, or to programmable circuitry, locally or via a local area network (LAN), wide area network (WAN) such as the Internet, etc. so that the processor of a general purpose computer, a special purpose computer, or other programmable data processing apparatus or the programmable circuitry execute the computer-readable instructions so as to create means for performing operations specified in the flowcharts or block diagrams. Examples of the processor include a computer processor, a processing unit, a microprocessor, a digital signal processor, a controller, a microcontroller, and the like.

While the embodiments of the present invention have been described, the technical scope of the invention is not limited to the above described embodiments. It is apparent to persons skilled in the art that various alterations and improvements can be added to the above-described embodiments. In addition, the matters described in the specific embodiment can be applied to other embodiments without technical contradiction. Each constitutional element may have a similar feature to another constitutional element having the same name and different reference sign. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES

100: vehicle, 120: input/output system, 130: vehicle motion system, 140: sensing system, 150: control system, 220: driving device, 222: steering, 224: paddle shift, 226: accelerator pedal, 228: brake pedal, 240: instrument panel, 242: mechanical instrument, 244: mechanical switch, 250: display device, 252: instrument image, 254: switch image, 320: wheel, 330: electricity storage system, 340: power system, 342: electricity generator, 344: internal combustion engine, 346: electric motor, 350: power transmission system, 360: mechanical brake, 372: drive system, 374: braking system, 390: motion control ECU, 392: rotation number setting unit, 394: torque setting unit, 432: current measurement unit, 434: voltage measurement unit, 442: rotation number measurement unit, 444: torque estimation unit, 520: input control ECU, 530: display control ECU, 550: storage unit, 552: shift information storage unit, 554: image data storage unit, 556: high-efficiency setting storage unit, 558: pseudo stepped setting storage unit, 620: steering amount acquisition unit, 630: acceleration operation amount acquisition unit, 640: braking level acquisition unit, 650: braking operation amount, 660: sensor output acquisition unit, 710: input receiving unit, 720: operation mode determination unit, 732: target drive force calculation unit, 734: electricity generation amount calculation unit, 736: target rotation number calculation unit, 738: rotation number correction unit, 740: output display value decision unit, 750: instrument control unit, 822: control target value, 824: control target value, 830: vehicle speed, 922: display value, 924: display value, 3000: computer, 3001: DVD-ROM, 3010: host controller, 3012: CPU, 3014: RAM, 3016: graphic controller, 3018: display device, 3020: input/output controller, 3022: communication interface, 3024: hard disk drive, 3026: DVD-ROM drive, 3030: ROM, 3040: input/output chip, 3042: keyboard

What is claimed is:

1. A control device configured to control a power indicator configured to present a user of a moving body having drive wheels, a motor and an electricity storage device with a magnitude of power that is supplied from the motor and the electricity storage device to the drive wheels, the control device comprising:
a motor output decision unit configured to decide a magnitude of an output of the motor, based on a magnitude of a requested output that is an output requested to be supplied to the drive wheels;
a first rotation number decision unit configured to decide a first target value of a rotation number of the motor, based on the magnitude of the output of the motor decided by the motor output decision unit; and
a display control unit configured to change a display method of the power indicator in a case where the motor supplies power to the drive wheels in a first mode and in a case where the motor supplies power to the drive wheels in a second mode different from the first mode, wherein
the motor supplies power to the drive wheels in the second mode when the output of the motor decided by the motor output decision unit is equal to or larger than a predetermined first threshold value and the first target value of the rotation number decided by the first rotation number decision unit is equal to or larger than a predetermined second threshold value.

2. The control device according to claim 1, further comprising:
a display value decision unit configured to decide a display value indicative of the magnitude of power that is displayed on the power indicator, wherein
the display value decision unit is configured to decide the display value, based on the rotation number of the motor decided by the first rotation number decision unit.

3. The control device according to claim 2, wherein
the first mode is an operation mode in which the rotation number of the motor is adjusted so that an efficiency of the motor when the motor outputs power is equal to or larger than a predetermined value or is larger than the predetermined value, and
the second mode is an operation mode in which the rotation number and torque of the motor are adjusted so that the moving body changes speed in a pseudo stepped shifting manner.

4. The control device according to claim 3, further comprising:
a second rotation number decision unit configured to decide a second target value that is a target value of the rotation number of the motor in the second mode, based on the magnitude of the output of the motor decided by the motor output decision unit, wherein
the display value decision unit is configured to decide the display value, based on (i) the magnitude of power and (ii) a ratio of a difference between the first target value and the second target value to a maximum rotation number or a rated rotation number of the motor.

5. The control device according to claim 1, wherein
the moving body further includes an electricity generator configured to convert power generated by the motor into electric power, and
the motor output decision unit is configured to decide a magnitude of the electric power generated by the electricity generator, as the magnitude of the output of the motor.

6. The control device according to claim 2, wherein
the moving body further includes an electricity generator configured to convert power generated by the motor into electric power, and
the motor output decision unit is configured to decide a magnitude of the electric power generated by the electricity generator, as the magnitude of the output of the motor.

7. The control device according to claim 3, wherein
the moving body further includes an electricity generator configured to convert power generated by the motor into electric power, and
the motor output decision unit is configured to decide a magnitude of the electric power generated by the electricity generator, as the magnitude of the output of the motor.

8. The control device according to claim 4, wherein
the moving body further includes an electricity generator configured to convert power generated by the motor into electric power, and
the motor output decision unit is configured to decide a magnitude of the electric power generated by the electricity generator, as the magnitude of the output of the motor.

9. A moving body comprising:
drive wheels;
an electric motor;
a motor and an electricity storage device configured to supply power to the drive wheels via the electric motor;
a power indicator configured to present a user of the moving body with a magnitude of power that is supplied from the motor and the electricity storage device to the drive wheels via the electric motor; and
the control device according to claim 1 configured to control the power indicator.

10. The moving body according to claim 9, further comprising:
an electricity generator configured to convert power generated by the motor into electric power, wherein the electric motor is configured to supply power to the drive wheels by using electric power supplied from at least one of the electricity generator and/or the electricity storage device.

11. A non-transitory computer-readable storage medium having a program stored thereon, the program being a program for causing a computer to execute a control method for controlling a power indicator configured to present a user of a moving body having drive wheels, a motor and an electricity storage device with a magnitude of power that is supplied from the motor and the electricity storage device to the drive wheels, the control method comprising:

deciding a magnitude of an output of the motor, based on a magnitude of a requested output that is an output requested to be supplied to the drive wheels;

deciding a first target value of a rotation number of the motor, based on the magnitude of the output of the motor decided in the deciding of the motor output; and changing a display method of the power indicator in a case where the motor supplies power to the drive wheels in a first mode and in a case where the motor supplies power to the drive wheels in a second mode different from the first mode, wherein the motor supplies power to the drive wheels in the second mode when the output of the motor decided in the deciding of the motor output is equal to or larger than a predetermined first threshold value and the first target value of the rotation number decided in the deciding of the first rotation number is equal to or larger than a predetermined second threshold value.

12. A control method for controlling a power indicator configured to present a user of a moving body having drive wheels, a motor and an electricity storage device with a magnitude of power that is supplied from the motor and the electricity storage device to the drive wheels, the control method comprising:

deciding a magnitude of an output of the motor, based on a magnitude of a requested output that is an output requested to be supplied to the drive wheels;

deciding a first target value of a rotation number of the motor, based on the magnitude of the output of the motor decided in the deciding of the motor output; and changing a display method of the power indicator in a case where the motor supplies power to the drive wheels in a first mode and in a case where the motor supplies power to the drive wheels in a second mode different from the first mode, wherein the motor supplies power to the drive wheels in the second mode when the output of the motor decided in the deciding of the motor output is equal to or larger than a predetermined first threshold value and the first target value of the rotation number decided in the deciding of the first rotation number is equal to or larger than a predetermined second threshold value.

13. The control method according to claim 12, further comprising:

deciding a display value indicative of the magnitude of power that is displayed on the power indicator, wherein the deciding of the display value includes deciding the display value, based on the rotation number of the motor decided in the deciding of the first rotation number.

\* \* \* \* \*